(12) United States Patent
Weiss

(10) Patent No.: US 6,443,460 B2
(45) Date of Patent: Sep. 3, 2002

(54) ELASTIC SEAL FOR A GUIDE ROLLER

(75) Inventor: Josef Weiss, Gössweinstein (DE)

(73) Assignee: Ina Walzlager Schaeffler Ohg, Herzogenaurach (DE)

(*) Notice: Subject to any disclaimer, the term of this patent is extended or adjusted under 35 U.S.C. 154(b) by 64 days.

(21) Appl. No.: 09/764,815

(22) Filed: Jan. 18, 2001

(30) Foreign Application Priority Data

Jan. 18, 2000 (DE) .......................................... 100 01 681
May 18, 2000 (DE) .......................................... 100 24 529

(51) Int. Cl.$^7$ ............................................... F16J 15/32
(52) U.S. Cl. ..................................... 277/549; 384/485
(58) Field of Search ................................ 277/549, 559, 277/562, 566; 384/58, 449, 484, 485

(56) References Cited

U.S. PATENT DOCUMENTS

| | | | |
|---|---|---|---|
| 3,596,533 A | * | 8/1971 | Nightingale |
| 4,605,318 A | * | 8/1986 | Kaiser |
| 4,808,012 A | * | 2/1989 | Otto |
| 5,676,383 A | * | 10/1997 | Chandler |

FOREIGN PATENT DOCUMENTS

| | | |
|---|---|---|
| DE | 0035957 | 1/1965 |
| DE | 1264170 | 5/1968 |
| DE | 7230879 | 1/1973 |
| DE | 2240144 | 4/1973 |
| DE | 7321112 | 9/1973 |
| DE | 8428429 | 9/1986 |

OTHER PUBLICATIONS

Search Report dated Jul. 27, 2000 from German Patent Office for Priority Application No. 100 01 681.2.

* cited by examiner

Primary Examiner—Robert J. Sandy
Assistant Examiner—Karlena D. Schwing
(74) Attorney, Agent, or Firm—Volpe and Koenig, P.C.

(57) ABSTRACT

A guide roller with a sealing element (14) formed in one piece in a T-shape having a first axial sealing portion (15) that is placed securely onto a shoulder of the inner race, a second sealing portion (16) that extends radially outwardly and is located inside a second groove of the outer race (13), and a third sealing portion (17) that extends radially inwardly branching off from the first sealing portion (15) at its inner end is provided so that axial contact between the shoulder and the outer race (10) is prevented by the third sealing portion (17).

7 Claims, 2 Drawing Sheets

ELASTIC SEAL FOR A GUIDE ROLLER

BACKGROUND

This invention relates to a guide roller with at least one roller body set and an inner race in the form of a bolt or pin that is located inside a receiving hole of an outer race. The inner race has a shoulder at each exterior axial end that is held within a first groove of the outer race so that axial shifting of the outer race with respect to the inner race is limited. A second groove exists inside the first groove that is offset inward in the axial direction and outward radially. A sealing element is located inside of this second groove.

A guide roller of this general type that is sealed in this way is known from DE-OS 22 40 144. It is formed of a shoulder pin that simultaneously constitutes the inner track for a set of bearing needles, whereas the outer track is formed from a thick-walled outer ring that has a hole in it to receive the pin. The thick-walled outer ring has a groove at both axial ends in which a sealing ring is placed. This sealing ring is designed with a reverse L shape. Its long side sits against a front face of the groove and its short side is held in another groove that is offset outward in the radial direction with respect to the first notch. This second short side turns inward in the radial direction and has a sealing lip lying against the shoulders of a pin and a butt ring.

The disadvantage in this setup is that this sealing ring is designed in very compact fashion, i.e. is not very flexible, so that re-greasing is only possible under very difficult conditions. In order to change the grease, i.e. to flush the lubricant, a very high pressure has to be applied. This high pressure could lead to damage to the installed sealing ring over time.

SUMMARY

The object of the invention is therefore to develop a seal of the above type for a guide roller that does not exhibit the above disadvantages, i.e. allows for improved re-greasing.

According to the invention, this object is met by the characterizing portion of claim 1 in that the sealing element is designed in a single piece in a T-shape in such a way that a first axial sealing portion is placed securely onto the shoulder, a second sealing portion is positioned in the second groove and extends radially outward and a third sealing portion extending radially inward branch off from the first sealing portion at its inner end so that axial contact between the shoulder and the outer race is prevented by the third sealing portion.

The first axial sealing portion provides a secure hold of the three-part seal by means of it being solidly seated on the shoulder. In this way, it is advantageous that the radial thickness of the first sealing portion be selected so that only a very minimal gap remains between it and the outer race. This minimal gap prevents the penetration of dirt into the bearing interior. The second sealing portion extending radially outward at the inner end thereof, and is designed as a flexible sealing lip that forms a labyrinthine seal with the second groove of the outer race. This again prevents the penetration of dirt into the bearing interior. The third sealing portion extending radially inwardly has the function of preventing contact between the shoulder and the outer race, i.e. the contact of metal with metal. This eliminates metal abrasion and thus contamination of the lubricant, which is associated with a reduction of the lifespan.

Other advantageous embodiments of the invention are described in claims 2 through 7.

According to claim 2, the third sealing portion takes a direction that deviates in the radial direction by an angle a with respect to a perpendicular median. This slanted position serves to cushion the outer race when it shifts axially and at the same time it functions similar to a frictional seal. This slanted position, i.e. by keeping the contact surfaces away from each other, keeps the frictional moment of the bearing as small as possible.

In an additional feature according to claim 3, the third sealing portion is provided with slots at an even distance from one another around it. These slots can be used on the one hand as an additional lubricant reservoir and on the other hand can provide for the free exchange of lubricant inside the bearing. The lubricant can flow out under pressure during re-greasing so that an evenly distributed exchange of lubricant is possible.

Claim 4 indicates that the second sealing portion, the sealing lip, assumes an alignment that deviates by an angle β from a perpendicular median in the radial direction. This ensures that the second groove is subdivided by the sealing lip into two spaces that can also be used as a lubricant reservoir. The grease rims forming in this space also provide an added seal for the bearing against contamination.

In another feature of the invention according to claim 5, its flanges should be formed by a shoulder permanently attached to the pin on one side and by a stop ring on the other side that is pressed against the shoulder pin.

Finally, according to claim 6, the roller body set of the guide roller is designed as cage guided needle bearings. According to claim 7, the pin has an axial lubricant bore and a radial lubricant bore branching off from it that opens up into the track area of the roller set. In this way, the bearing can be effectively greased.

BRIEF DESCRIPTION OF THE DRAWINGS

The invention is explained in more detail in connection with the following embodiment.

In the drawings.

DETAILED DESCRIPTION OF THE PREFERRED EMBODIMENTS

Figure 1:
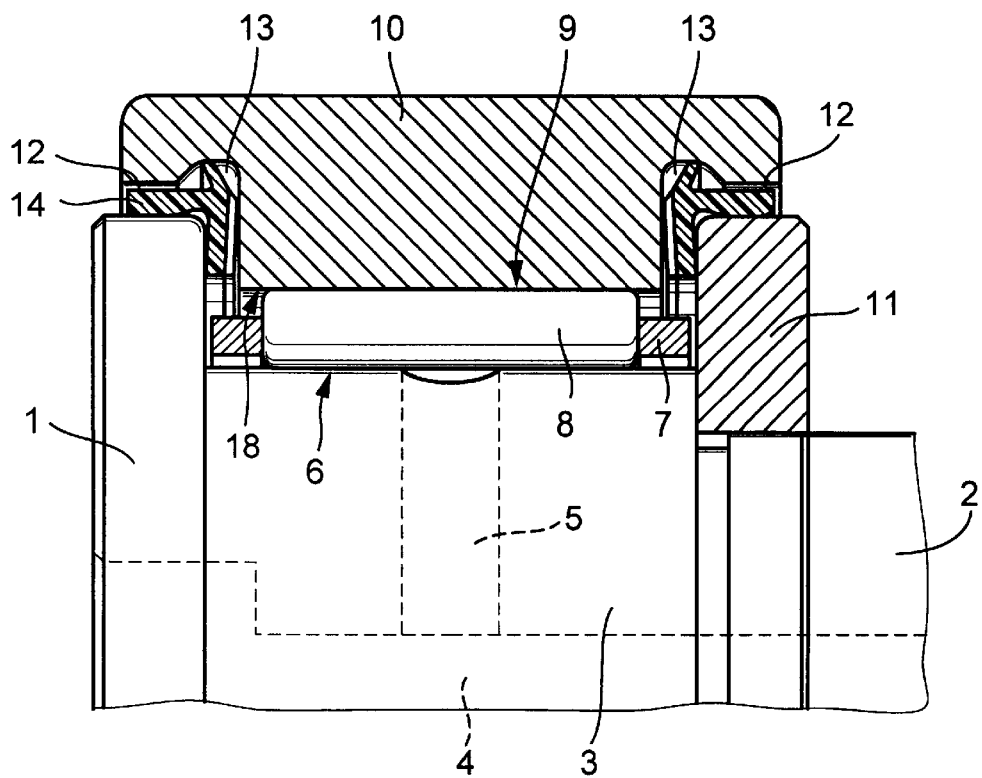
FIG. 1 is a side view of a guide roller according to the invention, partially in cross-section, with a neutral outer ring position.

The guide roller shown in FIG. 1 is formed from a bolt or pin 2 acting as an inner race, and of the outer race 10, between which bearing needles 8 ride on associated tracks 6 and 9, guided by a cage 7. Here, the outer race 10 is shown in a neutral position, i.e. its central section, which constitutes track 9, is at the same distance from shoulder 1 of pin 2 as it is from the stop ring 11. The pin 2 includes a centrally located axial grease bore 4, from which radial grease bore 5 branches off in the center section 3 and opens up into the inner track area 6. The outer race 10 has a receiving opening 18 for the pin 2, with enough intermediate space for the bearing needles, with a first groove 12 located at both of its ends into which the shoulder 1 of the pin 2 and the stop ring 11 are placed. This configuration ensures that shoulder 1 and stop ring 11 limit any axial shift of the outer race 10.

Figure 2:
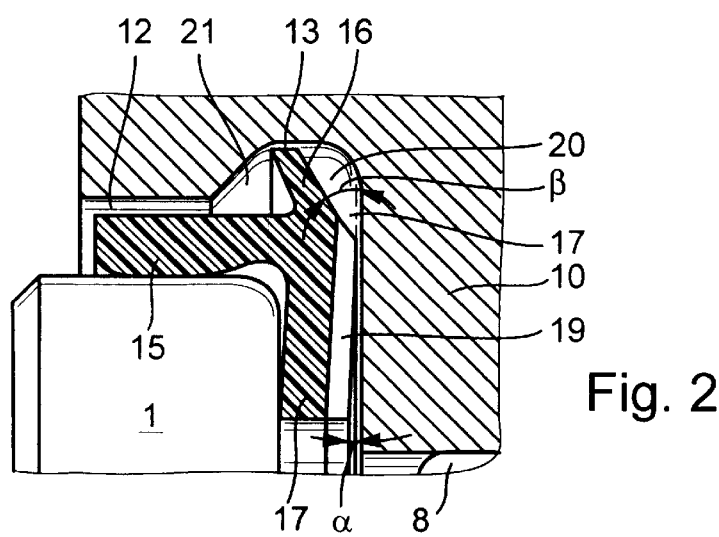
FIG. 2 is an enlarged representation of the sealing element according to FIG. 1.

As seen in FIG. 1 and in particular in FIG. 2, the second groove 13 branches off from the first groove 12 and extends inwardly in the axial direction and outwardly in the radial direction with respect to the first groove 12. Located in the groove 12 is a sealing element 14, with a first axial sealing portion 15 placed securely onto the shoulder 1 and onto the stop ring 11. The second sealing portion 16 branches off from the first sealing portion 15 radially outwardly into the second groove 13 at its inner axial end in the form of a sealing lip. The sealing lip 16 deviates outward by a tilt angle β with respect to a perpendicular median so that the second groove 13 is divided into two partial spaces 20 and 21 that can be used as additional lubricant spaces. The sealing lip 16 forms a gap seal with the wall of groove 13 so that the penetration of dirt into the bearing interior is made more difficult.

Figure 3:
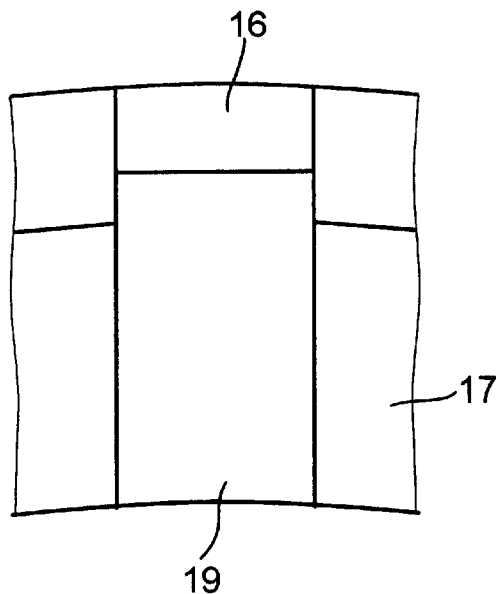
FIG. 3 is a side view of the sealing element according to FIG. 2.

Opposite the sealing lip 16, the third sealing portion 17 extends radially inwardly. It extends axially outwardly, offset by a tilt angle a with respect to a perpendicular median so that portion 17 sits against shoulder 1 and against the stop ring 11 only at a point. As can be seen from FIGS. 2 and 3, the third sealing portion 17 of the sealing element is provided with slots 19 evenly spaced from one another around it. On one hand, these slots act as lubricant reservoirs and on the other hand enable unhindered lubricant flow through the bearing. This is done by passing lubricant into the track area 6 from the outside through axial grease bore 4 and radial grease bore 5. The lubricant is then able to exit the bearing through the slots 19 of the third sealing portion 17, through the labyrinthine seal between sealing lip 16 and notch 13, as well as through the gap between the outer race 10 and the first sealing portion 15. The first axial sealing portion 15 of the sealing element 14 is designed such that it nearly takes up all of the first groove 12 completely so that only a small gap is formed, thereby making the penetration of contaminants from the outside into the bearing interior more difficult.

Figure 4:
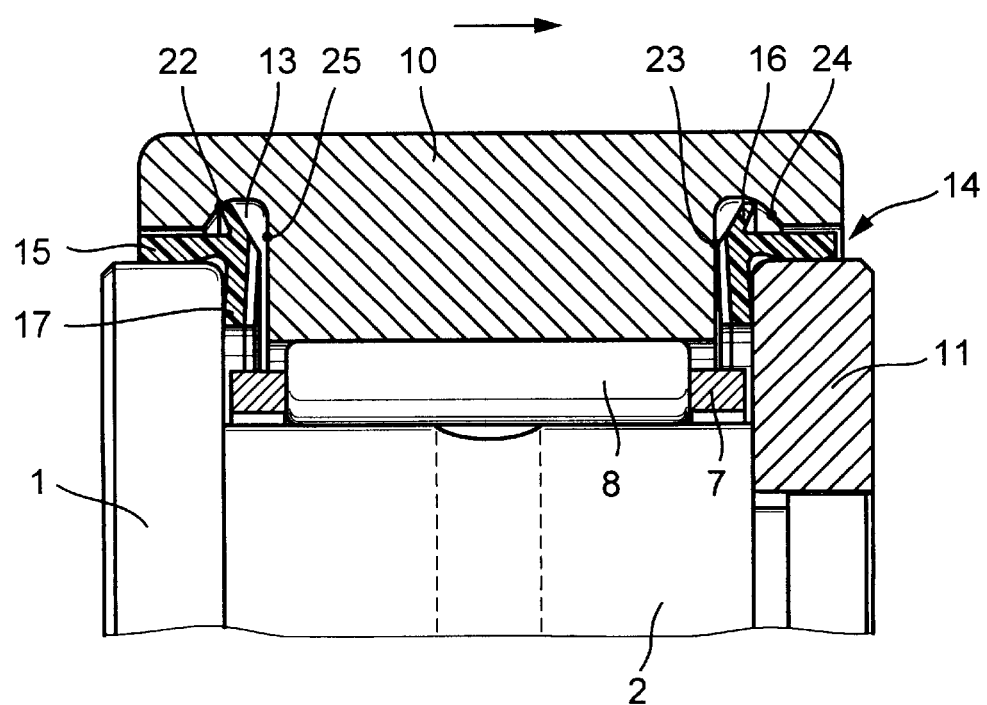
FIG. 4 is another side view of a guide roller according to the invention, partially sectioned, with a shifted outer ring position.

In FIG. 4, the guide roller is shown with outer race 10 shifted from its neutral position toward the right in the direction of the arrow. As the outer race rotates, points of contact 22 and 23 are formed between sealing section 16 and the wall of the second groove 13 on the left side as well as between the transition area between the second and third sealing portions 16 and 17 and the opposite face of the outer race 10 on the right side. In this way, a frictional seal is created. If the outer race 10 moves in the direction opposite to the arrow, a friction seal again arises that in that case is formed by points of contact 24 and 25.

References

1 Shoulder
2 Pin
3 Center Section
4 Axial grease bore
5 Radial grease bore
6 Inner track
7 Cage
8 Bearing needles
9 Outer track
10 Outer race
11 Stop ring

-continued

References

12 First groove
13 Second groove
14 Sealing element
15 First axial sealing section
16 Second sealing section, extending radially outwardly
17 Third sealing section, extending radially inwardly
18 Receiving opening
19 Slot
20 Partial space
21 Partial space
22 Point of contact
23 Point of contact
24 Point of contact
25 Point of contact
α, β Tilt angles

What is claimed is:

1. A guide roller with at least one roller body set and one inner race in the form of a pin (2) that is located inside of a receiving opening (18) of an outer race (10), whereby the inner race contains an axial flange at each outer end which is located inside a first groove (12) of the outer race (10) so that an axial shift of the outer race (10) with respect to the inner race is limited and whereby in the first groove (12), another groove (13) is present at each end that extends axially inwardly and radially outwardly and that contains a sealing element, the sealing element (14) is formed in one piece in a T-shape with a first axial sealing portion (15) located securely on the shoulder, a second sealing portion (16) that extends radially outwardly is located within the second groove (13) and a third sealing portion (17) that extends radially inwardly branches off from the first sealing portion (15) at an inner end thereof so that axial contact of the shoulder and the outer race (10) is prevented by the third sealing portion (17).

2. A guide roller according to claim 1, wherein the third sealing portion (17) extends in a direction that deviates radially from a perpendicular median by an angle α.

3. A guide roller according to claim 1, wherein the third sealing portion (17) is provided with evenly spaced slots (19).

4. A guide roller according to claim 1, wherein the second sealing portion (16) extends in a direction that deviates radially from a perpendicular median by an angle β.

5. A guide roller according to claim 1, wherein the flange is formed by a shoulder (1) of the pin (2) on one side and by a stop ring (11) on the other side.

6. A guide roller according to claim 1, wherein the roller body set comprises bearing needles (8) guided by a cage (7).

7. A guide roller according to claim 1, wherein the pin (2) has an axially extending lubricant bore (4) with a radially extending lubricant bore (5) that branches therefrom, (5), which opens into a track area (6) of the roller body set.

* * * * *